Patented Jan. 16, 1945

2,367,302

UNITED STATES PATENT OFFICE 2,367,302

BISULPHITE DERIVATIVES OF 2-METHYL-1,4-NAPHTHOQUINONE AND THE LIKE

Marjorie B. Moore and Frederick J. Kirchmeyer, Waukegan, Ill., assignors to Abbott Laboratories, North Chicago, Ill., a corporation of Illinois No Drawing. Application March 25, 1940, Serial No. 325,800

8 Claims. (Cl. 260—396)

The present invention relates to pharmaceutical compositions and more particularly to water-soluble antihemorrhagic naphthoquinones having vitamin K activity.

It has been shown by animal tests and clinical investigations that 2-methyl-1,4-naphthoquinone possesses great vitamin K activity. Attempts, however, to use this product, i. e., methylnaphthoquinone per se, have not been completely satisfactory. It was found, for example, that satisfactory concentrations could not be obtained for parenteral administration due to the extremely low solubility of the naphthoquinones in suitable solvents. It was also found that the naphthoquinone products were relatively unstable and that the products had a tendency to undergo a change in vitamin potency when stored for some time.

Therefore, the principal object of the present invention is to provide novel antihemorrhagic compositions of the type desired.

A more specific object of the present invention is to provide 2-methyl-1,4-naphthoquinone compositions which form stable aqueous solutions of the desired concentrations for parenteral administration.

Other objects of the present invention will be apparent as the description hereinafter proceeds.

We have discovered that bisulphites, i. e., water soluble bisulphite salts form addition compounds with alkyl substituted naphthoquinones and that such addition compounds possess in available form the desired vitamin activity. We have also discovered that the bisulphite addition compounds have a much greater water solubility than the naphthoquinone product itself and that this increase in solubility provides means for readily obtaining solutions of the desired concentrations for parenteral administration. We have further discovered that the addition compounds as well as solutions of the same are stable and that they retain the original vitamin potency for long periods of time.

The compounds of the present invention may be prepared by mixing the alkyl substituted naphthoquinone with the bisulphite salt in the presence of water. Ordinarily gentle warming of the aqueous mixture is preferred to facilitate solution. The following representative examples which may be prepared as indicated above will serve to illustrate the present invention:

I 2-methyl-1,4-naphthoquinone _____mg__ 250
Sodium bisulphite_____mg__ 149
Water (distilled) _____c. c__ 250

II 2-methyl-1,4-naphthoquinone _____mg__ 250
Potassium bisulphite_____mg__ 349
Water (distilled) _____c. c__ 250

In the above examples, Example I employs molar equivalents of sodium bisulphite and 2-methyl-1,4-naphthoquinone, and Example II employs 2 molar equivalents of potassium bisulphite to 1 molar equivalent of 2-methyl-1,4-naphthoquinone. These examples representing preferred ratios of ingredients are merely illustrative and are not to be interpreted as limiting.

In place of the alkali metal salts used in the above illustrative examples other water soluble bisulphite salts may be substituted therefore including the alkaline earth metal salts such as calcium bisulphite. Other suitable salts are the nitrogen salts including the ammonium salt as well as the substituted ammonium salts including the primary, secondary and tertiary alkyl and substituted alkyl amine bisulphites and the corresponding quaternary ammonium bisulphites. Examples of suitable alkyl groups include the mono-, di-, tri- and tetra-methyl, ethyl, propyl, butyl, amyl, hexyl, etc., amine salts as well as the corresponding hydroxy alkyl or alkanol amine salts. The phenyl alkyl amines, e. g., benzylamine, as well as the aromatic amines, e. g., aniline, may also be employed. In addition to the above the cycloalkyl amines may be employed including the cycloalkyl groups in which the N is an element of a heterocyclic ring. Other heterocyclic amines containing a third element in the ring such as morpholine may also be used.

While, as indicated above, any water soluble bisulphite salt may be used to solubilize and stabilize the naphthoquinone, the sodium—Na, calcium—Ca, ethanolamine—$HOCH_2CH_2NH_2$, diethylamine—$(C_2H_5)_2NH$, diethyl hydroxy ethylamine—

$(C_2H_5)_2NCH_2CH_2OH$, and n-butylamine—$C_4H_9NH_2$, bisulphite ($HSO_3$) salts are representative types of preferred species. Salts such as barium bisulphite while operative are not preferred due to the relatively high toxicity of barium.

The bisulphite addition compounds of the present invention have been found to be stable in sunlight and also to be heat stable. Tests, for example, carried out in ampoules have shown aqueous solutions of the compounds not to be decomposed after exposure to a month's sunlight, while other tests have shown the solutions of the preferred compounds to retain their original potency (a) when stored in an oven at 60° C. for 15 days or (b) when sterilized at 15 pounds for 0.5 hour in an autoclave at about 122° C. These properties emphasize the radical differences between the stable compounds of the present invention and the properties of 2-methyl-1,4-naphthoquinone, the characteristic instability of which is illustrated by its sensitivity, i. e., decomposition, when exposed to light. Several tests including the freezing point test have demonstrated that the novel compositions of the present invention are true chemical compounds of the bisulphite salt and alkyl substituted naphthoquinone. The interaction and change of solubility is adequately illustrated by the fact that the higher alkyl amine bisulfites, such as lauryl amine bisulfite, form by themselves cloudy soapy solutions which upon addition of the relatively insoluble naphthoquinone change to clear sparkling solutions.

The dilute aqueous solutions of most of the compounds (e. g., containing 1 mg. of naphthoquinone per c. c.) made up of molecular equivalents of bisulphite salt and 2-methyl-1,4-naphthoquinone show a slight trace of yellow color while like solutions made up of 2 mols of bisulphite to 1 mol of 2-methyl-1,4-naphthoquinone are for the most part substantially water clear, i. e., colorless. The concentrated solutions (e. g., ½ and 1 molar solutions) on the other hand show a definite light yellow color while solutions of the ammonium salt possess a reddish color.

The solutions containing the larger proportions of bisulphite salt (e. g., Example II) are ordinarily preferred as they are more heat stable and thus permit higher sterilization temperature than the solutions containing smaller proportions of bisulphite salt. The smaller amounts of bisulphite salt, e. g., in 1 mol proportion or less, may be used, however, to advantage as the bisulphite even when present in less than 1 mol proportion increases the solubility of naphthoquinone and aids in stabilizing the solutions. Similarly larger amounts of bisulfite salt, e. g., 2.5 or 3 mol proportions, may be used although the use of amounts above the 2:1 ratio of bisulphite to naphthoquinone are not accompanied by proportional advantages in the pharmaceutical art.

The bisulphite addition compounds or complexes of the present invention have a vitamin K activity equal to that of the 2-methyl-1,4-naphthoquinone contained in the molecule or complex. The compounds, although suitable for oral administration, are particularly adaptable in aqueous solution for parenteral administration in the treatment of hemorrhagic conditions.

The present invention employing a water-soluble salt characterized by the presence of the $HSO_3$ group may be used to solubilize and stabilize various naphthoquinones although it is particularly adaptable for use with the alkyl substituted naphthoquinones having antihemorrhagic activity. It will be therefore understood that the present invention is not limited to the above illustrative examples. All modifications coming within the scope of the present invention are intended to be covered by the following claims.

We claim:

1. The method of solubilizing and stabilizing an anti-hemorrhagic naphthoquinone, which consists in mixing an unstable and relatively insoluble 2-methyl-1,4-naphthoquinone with a nontoxic water-soluble bisulphite salt in water, and thereby solubilizing and stabilizing said naphthoquinone without impairment of its vitamin K properties.

2. A pharmaceutical composition containing as an essential ingredient, an addition product, dissolved in water, of 2-methyl-1,4-naphthoquinone with an alkali metal bisulphite salt, said product being characterized by solubility and stability satisfactory for parenteral use, the vitamin K activity of said product being substantially equivalent to that of the 2-methyl-1,4-naphthoquinone present therein.

3. A pharmaceutical composition containing as an essential ingredient, an addition product, dissolved in water, of 2-methyl-1,4-naphthoquinone with a sodium bisulphite salt, said product being characterized by solubility and stability satisfactory for parenteral use, the vitamin K activity of said product being substantially equivalent to that of the 2-methyl-1,4-naphthoquinone present therein.

4. A pharmaceutical composition containing as an essential ingredient, an addition product, dissolved in water, of 2-methyl-1,4-naphthoquinone with a sodium bisulphite salt, said product being characterized by solubility and stability satisfactory for parenteral use, the vitamin K activity of said product being substantially equivalent to that of the 2-methyl-1,4-naphthoquinone present therein.

5. A pharmaceutical composition containing as an essential ingredient, an addition product, dissolved in water, of 2-methyl-1,4-naphthoquinone with an alkaline earth metal bisulphite salt, said product being characterized by solubility and stability satisfactory for parenteral use, the vitamin K activity of said product being substantially equivalent to that of the 2-methyl-1,4-naphthoquinone present therein.

6. A pharmaceutical composition containing as an essential ingredient, an addition product, dissolved in water, of 2-methyl-1,4-naphthoquinone with a calcium bisulphite salt, said product being characterized by solubility and stability satisfactory for parenteral use, the vitamin K activity of said product being substantially equivalent to that of the 2-methyl-1,4-naphthoquinone present therein.

7. A pharmaceutical composition containing as an essential ingredient, an addition product, dissolved in water, of 2-methyl-1,4-naphthoquinone with an alkanol amine bisulphite salt, said product being characterized by solubility and stability satisfactory for parenteral use, the vitamin K activity of said product being substantially equivalent to that of the 2-methyl-1,4-naphthoquinone present therein.

8. A pharmaceutical composition containing as an essential ingredient, an addition product, dissolved in water, of 2-methyl-1,4-naphthoquinone with an ethanolamine bisulphite salt, said product being characterized by solubility and stability satisfactory for parenteral use, the vitamin K activity of said product being substantially equivalent to that of the 2-methyl-1,4-naphthoquinone present therein.

MARJORIE B. MOORE.
FREDERICK J. KIRCHMEYER.